United States Patent [19]

Vlahos

[11] 4,235,513
[45] Nov. 25, 1980

[54] HIGH-GAIN PROJECTION SCREEN

[75] Inventor: Petro Vlahos, Tarzana, Calif.

[73] Assignee: National Association of Theatre Owners, Inc., New York, N.Y.

[21] Appl. No.: 960,465

[22] Filed: Nov. 13, 1978

[51] Int. Cl.³ .............................................. G03B 21/60
[52] U.S. Cl. .................................... 350/129; 350/125
[58] Field of Search .................. 350/129, 125; 428/33, 428/46

[56] References Cited

U.S. PATENT DOCUMENTS

| 1,279,262 | 9/1918 | Clark | 350/129 |
| 1,550,880 | 8/1925 | Clark | 350/129 |

Primary Examiner—Richard A. Wintercorn
Attorney, Agent, or Firm—Charlton M. Lewis

[57] ABSTRACT

Lenticular projection screens of improved optical accuracy and uniformity are produced by deriving the specular surfaces of all lenticules within at least a major screen area from a common unitary optical surface, typically using replication by electroforming. The initial master surface is typically formed by conventional machining and polishing of a body having axial symmetry in the general shape of an ogive. The unitary convex surface of revolution of the ogive is repeatedly replicated, and like sections of each replica are isolated and assembled on a transparent reference surface. The assembled sections are adhered to a stiff back, and the optical assembly face is replicated. Multiple replicas of the initial assembly are typically again assembled and replicated, leading ultimately to unitary panel units which form the projection screen. For drive-in theaters or the like, each lenticule is preferably made non-uniform in vertical curvature in a manner which increases the image brightness for a large majority of the viewers. Various shapes of the viewing area can be fitted by suitably formed lenticules. Certain non-symmetrical viewing areas are closely fitted by tilting symmetrical lenticules about the optical axis of the projector. Reflected light from spurious sources is further reduced by baffles which project toward the audience from boundaries between concave lenticules.

7 Claims, 17 Drawing Figures

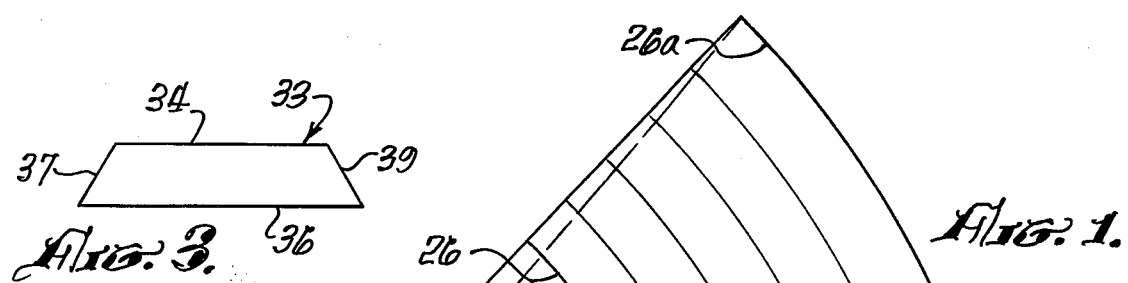
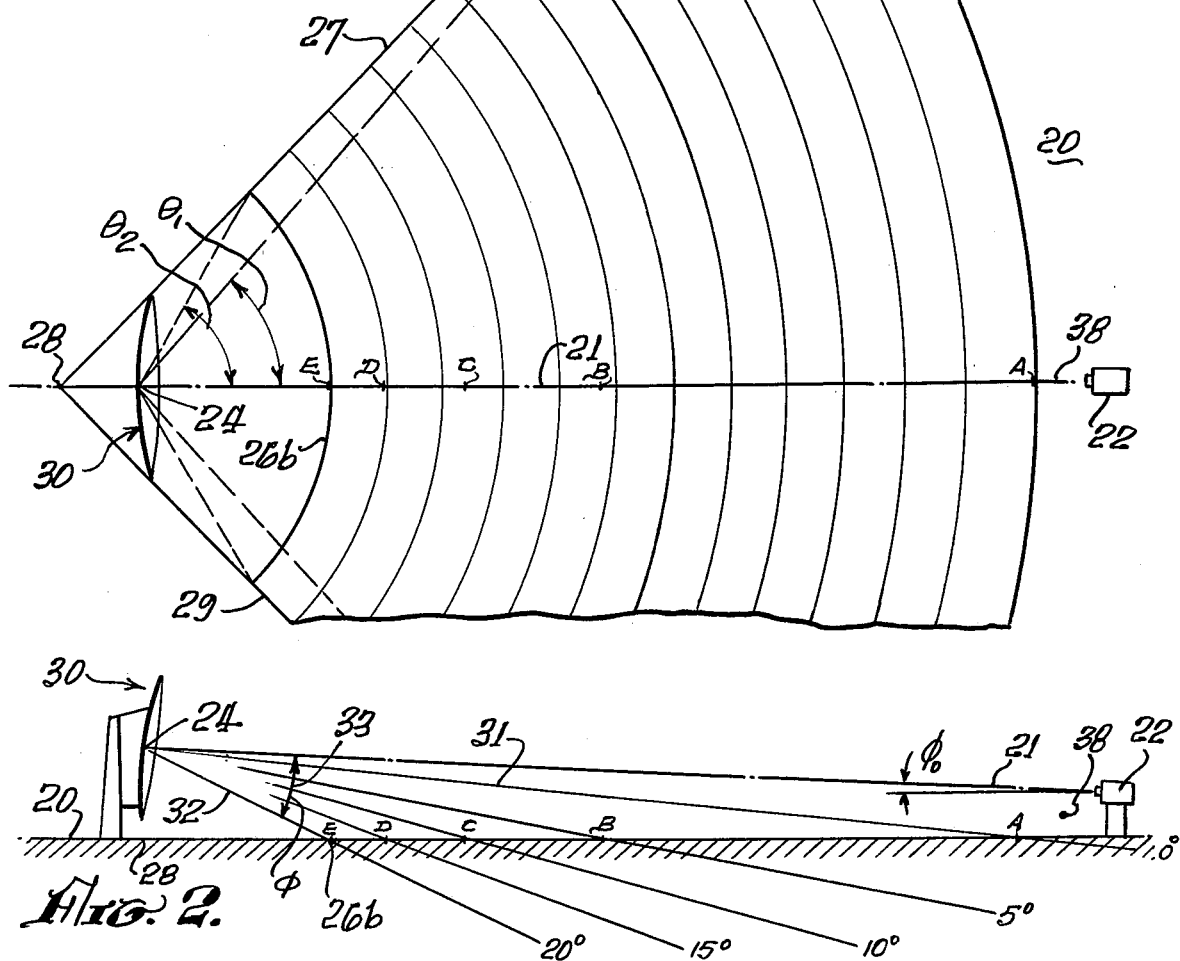
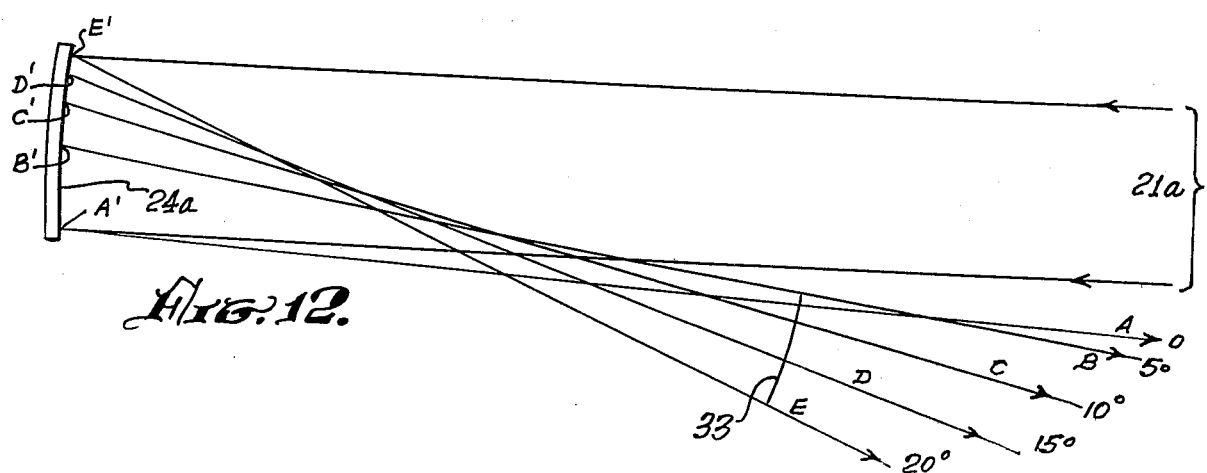

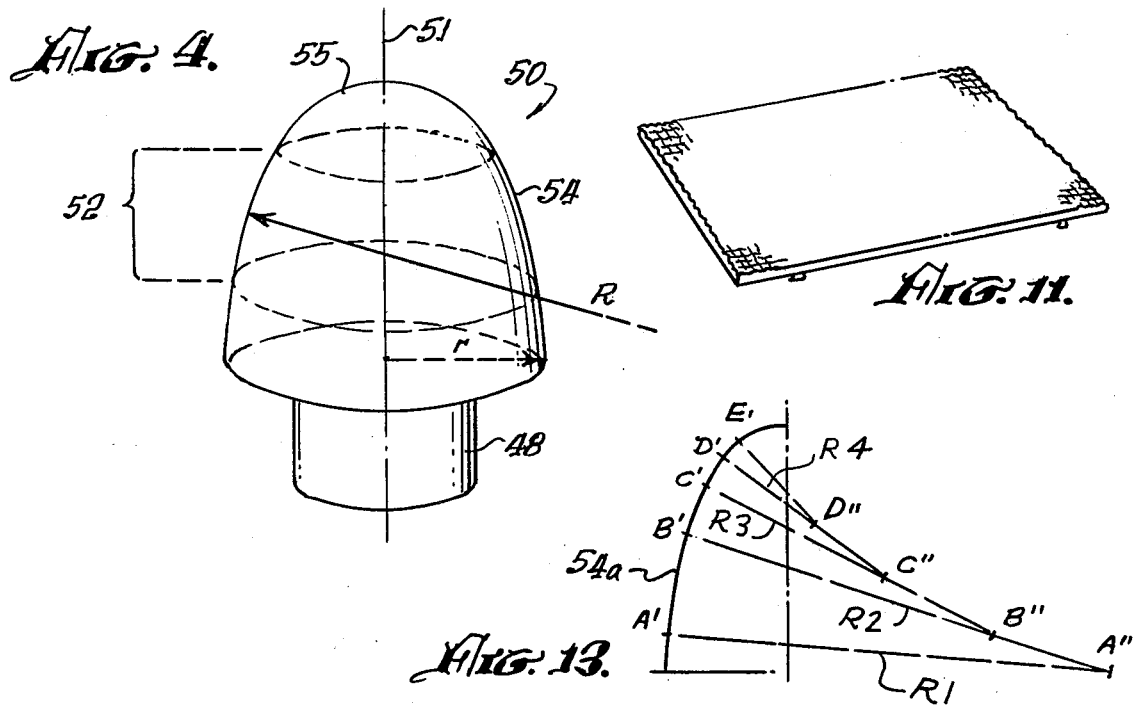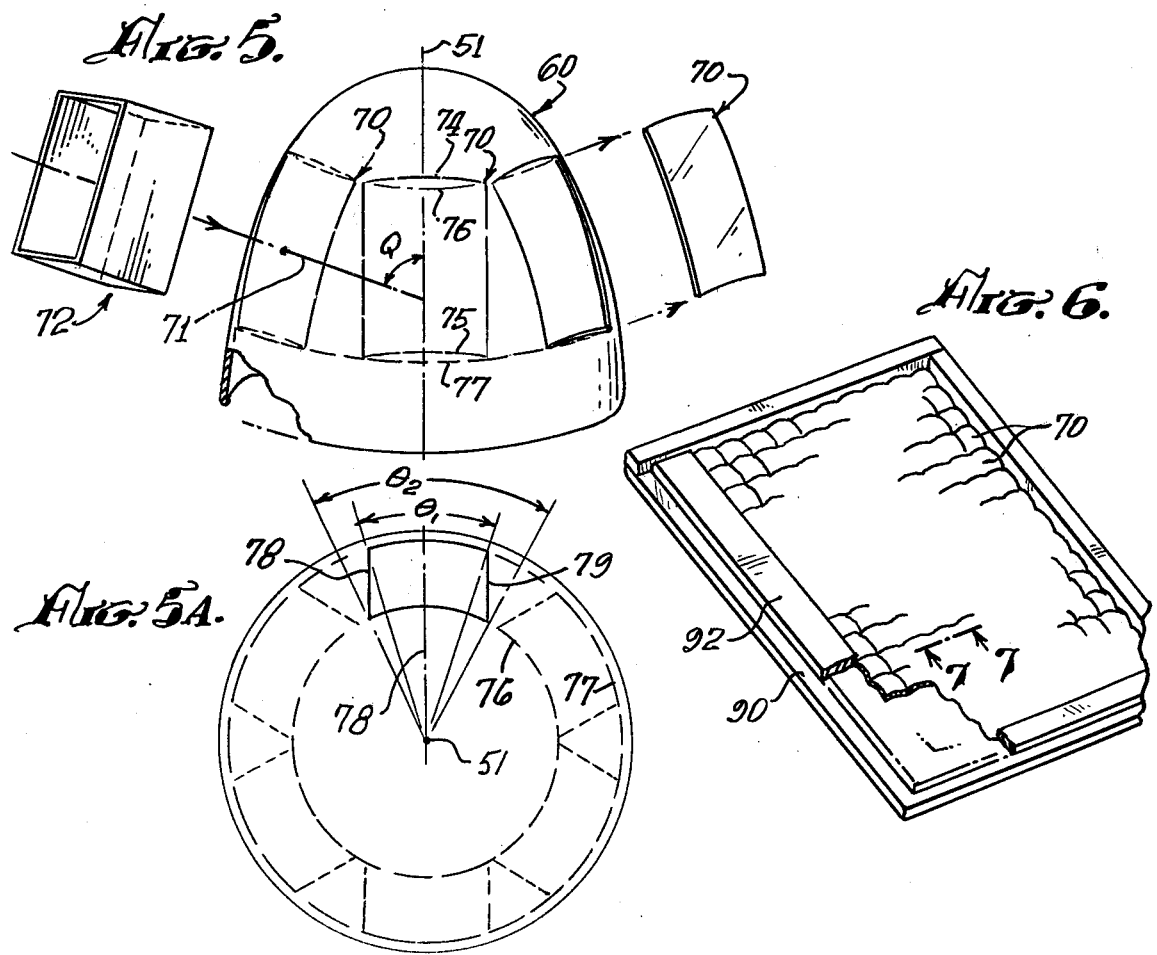

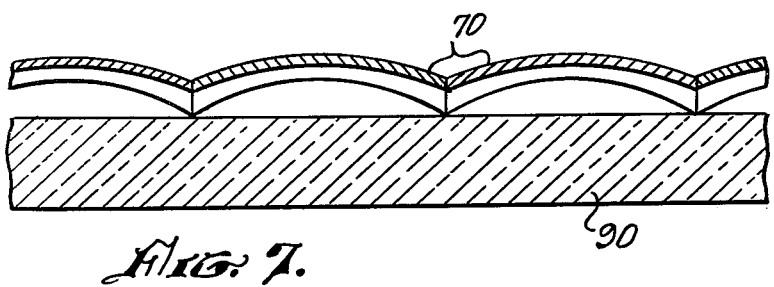
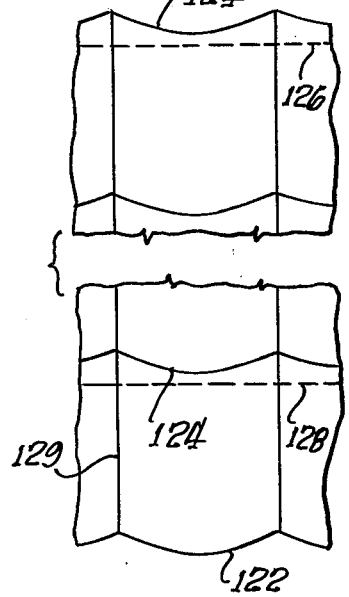
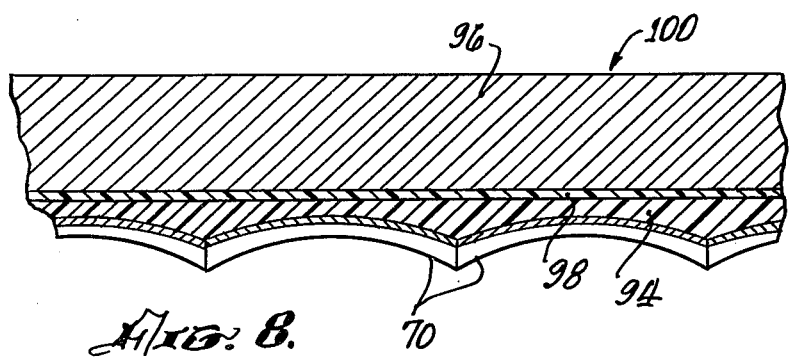
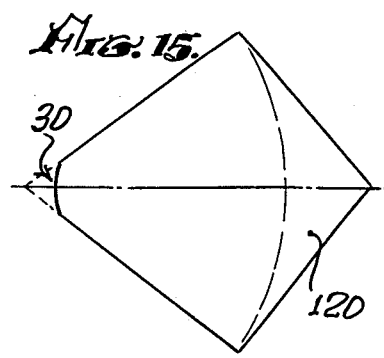
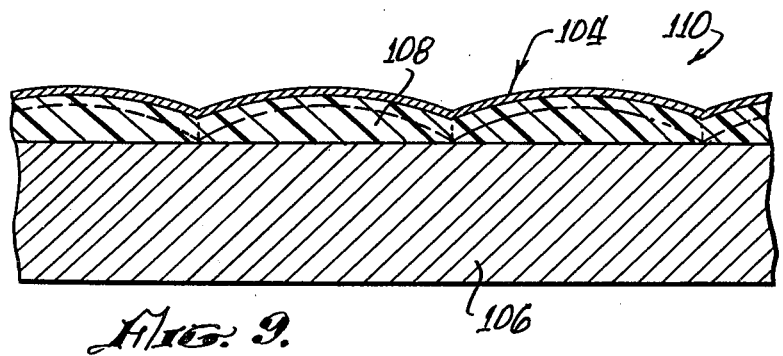
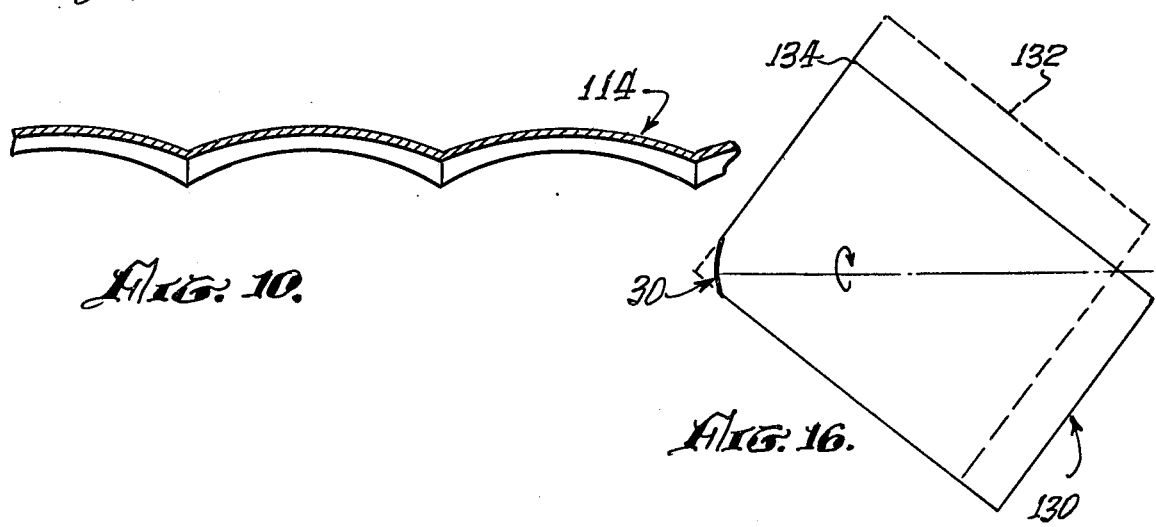

HIGH-GAIN PROJECTION SCREEN

BACKGROUND OF THE INVENTION

This invention is concerned with high-gain projection screens in which the reflective surface comprises a two-dimensional array of small specularly reflective optical elements or lenticules, typically all of identical shape and size. By suitable selection of the optical form of the lenticule surfaces considerable control can be exerted over the distribution of the reflected light.

Such screens are potentially useful for a wide variety of projection operations in which the required viewing area subtends only a limited solid angle at the screen. By concentrating all reflected light in that viewing area, the effective brightness of the projected image can be greatly improved; and the correspondingly reduced visibility of the image outside the established viewing area may also be highly desirable on its own account. Moreover, such "containment" of the image implies the complementary feature that light reaching the screen from the sky and from other spurious sources is reflected into the viewing area only at greatly reduced intensity.

All of those characteristics are potentially valuable in motion picture drive-in theaters. Because of the large scale of the projection image that is inherently required in such theaters, it is virtually impossible to obtain fully adequate image brightness with a diffusely reflecting or other conventional screen surface; and the hours of outdoor operation are seriously limited in summer by the long hours of twilight. Also, such theaters always prefer, and are sometimes required by law, to limit visibility of the picture to the regular viewing area.

At another range of scale, the enlargement of television images by projection on a screen is presently limited by lack of image brightness. The specular reflection of a lenticular screen potentially offers a gain of several fold in efficiency of light use, and could greatly extend the utility of projection for television and other information displays.

The theoretical possibility of closely controlling the angular distribution of the reflected light from a projection screen by forming the screen surface of many reflective lenticules of suitable optical form was recognized over six decades ago by Paul L. Clark. In four patents issuing between 1914 and 1925 he analyzed some of the optical properties of such screens. Those patents are numbered, 1,122,192, 1,279,262, 1,535,985 and 1,550,880, of which the first and especially the second are of primary interest. In particular, Clark showed that certain viewing areas of narrow elongated rectangular shape could be theoretically illuminated by arrays of lenticules having different vertical and horizontal curvatures corresponding to the respective dimensions of the viewing area to be served.

However, neither Clark nor others following his lead have been able to suggest any practicable way of actually producing the required optical structures with satisfactory uniformity and precision.

The practical problem of producing and mounting optically identical reflective elements or lenticules of compound curvature is made difficult by the very large number of lenticules usually required for each screen. The dimensions of each element must normally be small enough that an observer at the front of the viewing area cannot resolve individual lenticules as separate light sources. That condition is ordinarily satisfied if each lenticule measures no more than about 1/1200 of the distance from the closest viewer. For the front ramp of a drive-in theater, for example, that condition typically requires a maximum lenticule dimension of about one half inch. A typical screen surface 50 by 100 feet then needs nearly three million lenticules. Each individual lenticule must have good optical polish, must be oriented correctly within a close tolerance, and must conform accurately to a prescribed optical form suitable for the particular viewing to be illuminated.

A further practical difficulty in producing high gain screens of the described type results from the fact that most actual viewing areas have a far larger angular dimension horizontally than vertically. Each lenticule must therefore disperse the reflected light through a larger angle horizontally than vertically in order to fill the viewing area efficiently. That is preferably done by forming the lenticules with sharper curvature in the horizontal plane than in the vertical plane, resulting in a non-spherical surface which is relatively difficult to produce with accuracy and uniformity.

Although it is possible to obtain the required greater horizontal dispersion with a spherical reflecting surface, the lenticule boundaries must be correspondingly elongated horizontally, as in U.S. Pat. No. 2,763,184 to James G. Jackson, for example. If such lenticules are made small enough to keep the horizontal dimension less than the critical distance mentioned above, the vertical dimension is less than that critical distance, making the total number and total length of the joints between lenticules greater than necessary. That makes fabrication more difficult and tends to increase the scattered light, since slight imperfections of the joints between lenticules are found to be a primary source of scattered light.

Conventional optical methods for producing lenses and mirrors are not ordinarily applicable to surfaces having different curvatures in the two dimensions. Electromachining techniques are capable of producing highly accurate forms, but the surfaces are not specularly smooth. When such surfaces are polished the identity of shape tends to be destroyed.

One production procedure suggested in the prior art is to make a die from which a panel of elements can be molded or stamped as a unit, as suggested by Chester C. Pond in U.S. Pat. No. 2,552,455, for example. However, in machining such a die small variations tend to occur, due to wear of the machining tool and like causes. Also, it is difficult or impossible to obtain optically smooth surfaces that also conform precisely to the intended shape.

BRIEF DESCRIPTION OF THE INVENTION

An important object of the present invention is to provide fully effective and practicable methods for producing projections screens of the described type.

More particularly, the invention aims to provide procedures by which strictly identical lenticules of desired optical form can be mounted in accurate relative position and orientation over the entire surface of a projection screen.

The invention aims to produce screens in which the individual lenticules are formed with such precision and uniformity as to give satisfactorily close light control at the edges of the viewing area, and to avoid noticeable irregularities in image brightness over the screen surface or in different parts of the viewing area.

A further aspect of the invention concerns the development of practicable optical designs for the lenticules to produce desired patterns of light distribution for certain common forms of drive-in theaters or similar viewing areas.

A more particular aspect of the invention permits more effective overall utilization of the available light from the projector by distributing it over the viewing area in a suitable, intentionally non-uniform manner.

The invention further provides improved lenticule screens having sufficient optical quality that light from the projector can be reliably and substantially completely contained within prescribed viewing areas of certain specified shapes.

Another aspect of the invention provides baffle structure coordinated with the screen lenticules to virtually eliminate spurious light from the sky and from other sources outside of the viewing area.

Those and other objects and advantages are made possible, in preferred form of the invention by producing all of the lenticule surfaces of the screen, at least those intended to have a common optical form, by repeated highly accurate replication of a single common master of simple geometrical form. That process avoids problems due to wear of a cutting tool, and assures uniformity of shape throughout the resulting lenticule array.

The invention typically employs for the described replications the general technique of electroforming, which is commerically familiar in other fields, and which is capable of producing many successive replications of optical surfaces without significant loss of figure. The total number of required replications is typically minimized by approximately alternating steps of replication with steps of assembly of previously produced replicas to form assemblies of progressively increasing size. In that way only a moderate number of replicas need to be taken from any one configuration.

A further aspect of the invention is the preferred production of the initial master tool by conventional machining and polishing procedures. Such procedures are capable of producing with high accuracy a body having any geometical form which is a surface or revolution, that is, which may be generated geometically by revolving a line about an axis which lies in a common plane with the line. Many surfaces having different curvature along mutually perpendicular directions are of that general type, as was pointed out by Clark in the second of the patents already referred to. However, Clark used that fact only as an aid in describing the form of his surface elements. The present invention puts the same characteristic to practical use in the actual production of arrays of lenticules.

BRIEF DESCRIPTION OF THE DRAWING

A full understanding of the invention, and of its further objects and advantages, will be had from the following description of certain illustrative manners of carrying it out. The particulars of that description, and of the accompanying drawings which form a part of it, are intended only as illustration of the invention and not as a limitation upon its scope.

In the drawing:

FIG. 1 is a schematic plan representing an illustrative drive-in theater with selected light paths indicated and with one of its symmetrical halves partly broken away;

FIG. 2 is a schematic elevation corresponding to FIG. 1;

FIG. 3 is a schematic section of a reflected light beam from a single illustrative lenticule;

FIG. 4 is a schematic perspective representing an illustrative master ogive in accordance with the invention;

FIG. 5 is a schematic perspective representing an ogive replica and separation of ogive sections FIG. 5A is a schematic diagram in the aspect of a plan;

FIG. 6 is a schematic perspective representing an illustrative section assembly;

FIG. 7 is a fragmentary schematic section at enlarged scale on line 7—7 of FIG. 6;

FIG. 8 is a section corresponding to FIG. 7 and representing a rigidized section assembly;

FIG. 9 is a section corresponding to FIG. 8 and representing a rigidized unitary replica of a section assembly;

FIG. 10 is a section corresponding to FIG. 9 and representing a unitary concave replica;

FIG. 11 is a schematic perspective representing an illustrative lenticular screen panel;

FIG. 12 is a schematic diagram in the aspect of FIG. 2 representing reflection from a single lenticule and showing a modification;

FIG. 13 is a schematic diagram based on FIG. 4 and representing a modification;

FIG. 14 is a fragmentary plan corresponding generally to FIG. 10 and representing a modification;

FIGS. 15 and 16 are schematic plans corresponding generally to FIG. 1 and representing modified theater layouts.

DESCRIPTION OF ILLUSTRATIVE EMBODIMENTS OF THE INVENTION

Although the present invention is not limited to any particular use, it will be described for the sake of clarity primarily with respect to projection screens for outdoor theaters of the type known as drive-in theaters.

The general layout of an illustrative drive-in theater is shown schematically in plan in FIG. 1 and in elevation in FIG. 2, with the ground surface 20 indicated typically as a horizontal plane. The motion picture projector is shown schematically at 22 with its optical axis 21 intersecting the midpoint 24 of the projection screen 30. Axis 1 is inclined at the angle $\phi o$ with respect to the ground surface.

The automobiles from which the viewing audience will watch the picture are parked on ramps 26 arranged in conventional manner in concentric circular arcs facing the screen. The rear ramp is designated 26a and the front ramp 26b. The usual inclination of each ramp is neglected in FIG. 2 for clarity. Ramps 6 commonly extend on each side of optical axis 1 to the side boundary lines 27 and 29 of the viewing area. Those lines typically radiate from near the side edges of the screen, and their extensions intersect behind the screen at the point 28 at an angle which is typically about 90°. Point 28 may be the center of curvature of the ramp arcs, and may lie just inside a corner of the available property.

It is useful to consider first only a narrow pencil of light delivered from projector 22 along its optical axis 21 to midpoint 24 of the screen. To make that axial pencil visible to viewers on all ramps, it must be reflected with sufficient dispersion to distribute it as a beam 33 throughout the vertical dispersion angle $\phi$, formed between the lines 31 and 32 which extend from screen point 24 to the rear ramp 26a and to front ramp 26b, respectively (FIG. 2). That angle is typcially about 20°. The horizontal dispersion of axial light beam 33 must extend throughout the angle $\theta 1$ on each side of axis 21 to reach the ends of rear ramp 26a, and throughout the larger angle $\theta 2$ to reach the ends of front ramp 26b (FIG. 1).

Thus, the general form of the entire light beam 33 reflected from midpoint 24 of the screen can be visualized as having the cross section shown schematically in FIG. 3, in which linear dimensions correspond to angles subtended at the reflective lenticule at 24. That beam has the generally horizontal upper and lower boundaries 34 and 36, which diverge from each other at the vertical dispersion angle $\phi$, typically about 20°. The two generally vertical side boundaries 37 and 39 of beam 33 diverge from each other at a varying dispersion angle, which is $2\theta 1$ at the top and $2\theta 2$ at the bottom of the beam.

Such a reflected and dispersed beam can be produced by mounting at point 24 a small optical element with an optical reflective surface having compound curvature in the sense that the radius of curvature in a vertical plane differs from that in a horizontal plane. The total vertical bending of the elements, that is, the angular difference between normals drawn to the lenticule surface at its top and bottom edges, corresponds to the required vertical dispersion angle $\phi$ and the total horizontal bending corresponds to the required horizontal dispersion angle, which varies from $2\theta 1$ to $2\theta 2$. Since light incident upon a surface is reflected with angular deviation equal to twice the angle of incidence, the total vertical bending of the reflective element should be $\phi/2$, and the total horizontal bending should vary from $\theta 1$ at the top to $\theta 2$ at the bottom.

Now, if many optical elements identical to the central lenticule at 24 cover the screen surface, each will produce a similar pattern of reflected light. However each reflected beam will be laterally displaced slightly due to the relative offset of the optical elements from the screen center, and each beam will also be directed as a whole at a slightly different angle due to the different angle of the incident pencil of light from the projector. Both the lateral offset and the angular deviation of the light reflected from the off-axis elements can be compensated effectively for a selected point of the viewing area by bending the general screen surface as a whole in both vertical and horizontal dimensions in the same way that would be required to focus all projected light to that selected point if the screen had an optically smooth specular reflective surface. With that method of compensation, reasonably accurate control of the light reflected from all parts of the screen can be obtained with the entire screen covered with optical elements of identical form, but conforming in orientation to the general screen curvature.

It is usually preferred to design such large scale bending of the screen surface to produce optimum compensation for a central point near the rear of the viewing area, since accurate definition of the illuminated region tends to be most critical, both vertically and horizontally, at the rear ramp. The "containment" for light from the entire screen is then ordinarily sufficiently precise for all practical purposes at the other boundaries of the illuminated area.

The general screen curvature is therefore typically spherical about a center of curvature near the midpoint between the projector and the center of the rear ramp. Such a point is indicated at 38. The resulting screen curvature is ordinarily so slight as to be negligible within an area of the screen surface such as may be covered by a single panel of surfacing material, for example. Hence, the screen can be formed in practice of flat lenticule panels, all essentially identical optically and each mounted with its plane tangent to the general screen surface at the panel center. That general screen curvature is exaggerated in FIGS. 1 and 2 for clarity of illustration.

The present invention includes novel procedures for producing such panels of lenticule elements for mounting on a suitable screen frmaework. More particularly, the invention permits all the lenticular elements of all the panels to be derived by accurate replication from a single unitary body. That method of production insures effective optical identity of all lenticule surfaces throughout the entire face of the screen, or throughout any desired portion of the screen area.

FIG. 4 represents a solid body 50 having rotational symmetry with respect to the axis 51. That is, any axial section, taken through axis 51, has the same shape, shown typically by the line 54. The body may thus be considered to be generated geometrically by rotation of the generator line 54 about axis 51. A body of such form can be produced with high accuracy by conventional machining operations on a precision lathe or similar machine. Body 50 is typically made, for example, by turning or machining a solid body of stainless steel or other suitable material to the precise desired shape, using manual or automatic controls of known type. Any desired portion of the surface is then optically polished in conventional manner. The cylindrical base portion 48 of the body may be of arbitrary shape, preferably providing a convenient mount for machining and for other processing.

Next to base 48, generator line 54 is typically initially parallel to axis 51 at the radius r, curving smoothly toward the axis throughout the working portion of the body, indicated at 52, and preferably intersecting the axis perpendicularly. The nose portion 55 of the body may be of arbitrary detailed shape. A body having that general form is commonly known as an ogive. A portion of the ogive surface between two planes perpendicular to the axis, such as working portion 52, may be referred to as a zone; a portion between two planes through the axis, as a sector.

The precise form of generator line 54 may vary considerably, depending upon the shape and other parameters of the viewing area for which a particular screen is designed. In general, however, the total change of direction of the generator within the working portion must equal at least half the angle through which the reflected light beam is to be dispersed, shown as $\phi$ in FIG. 2. In accordance with a further aspect of the invention, to be described more fully below, that change of direction is preferably made non-uniform. However, for the present the curvature, which is inversely proportional to the radius of curvature R, may be considered constant.

After forming ogive 50 to the desired rotationally symmetrical form and optically polishing at least working portion 52 of its surface, a negative replica is made of that external ogive surface. Such a replica is shown somewhat schematically at 60 in FIG. 5. It may be made in any suitable manner. A preferred procedure is to electroplate the ogive surface with pure nickel to a suitable thickness, typically 0.02 inch or more. If the ogive was constructed of stainless steel or one of several other known materials, or has been suitably treated before plating, the nickel coating does not adhere, and may be slid bodily off the ogive. The resulting thin shell typically includes the entire nose portions 55, and thus forms a cup or thimble which is inherently quite rigid. The interior shell surface is an exact replica of the external ogive surface in every detail except for the inversion from convex to concave form. Since the ogive was highly polished the interior of the electroformed part is also highly polished. That technique of electroforming is well developed for making many types of replicas where a precision copy is wanted, as in making phonograph record stamping masters, for example.

In accordance with a further aspect of the invention, generally rectangular sections 70 are cut from the sidewall of the hollow replica 60 to serve as lenticule blanks, using any method that is suitable to the material of the shell. The preferred process for cutting a nickel replica shell is the well-known procedure of electromachining, which exerts virtually zero stress on the work. In this technique a brass or copper tool of suitable form is brought into close proximity to the nickel replica in a suitable electrolytic bath. Application of a pulsing electric current etches away the nickel in the immediate vicinity of the tool. The tool is typically of tubular shape, as indicated schematically at 72, and is advanced axially toward the ogive along a selected path, indicated at 71 in FIG. 5. That path can be varied as required and is controlled by accurate control apparatus, typically of conventional contruction and not explicitly shown. By employing a tool of hollow tubular form of rectangular cross section and of the desired internal dimensions, a generally rectangular section 70 of corresponding external dimensions is cut from the sidewall of the ogive replica.

With proper selection of the available parameters, including the tool form and the path 71 by which it approaches the work, as well as the form of the initial ogive itself, the resulting shell section that is cut away can be made to correspond precisely to the shape desired for the individual lenticules of a particular screen. More particularly, suitable selection of the relation between the ogive radius r and the radius of curvature R of generator line 54, and by corresponding positioning and dimensioning of the lenticule blank 70 on the ogive surface, it is possible to locate an area in which the surface bends vertically through an angle of $\phi/2$ and bends horizontally through an angle (FIG. 5A) that varies smoothly from $\theta1$ at one boundary to $\theta2$ at the other. That ogive section thus corresponds to the requirements discussed above in connection with FIGS. 1 and 2, and is potentially capable of functioning as a single screen lenticule.

Whatever detailed technique is used for separating each lenticule blank from the ogive replica shell, the tool must be centered precisely on the axis of the shell if the usual symmetrical lenticule shape is desired. Such symmetry is clearly indicated in FIGS. 5 and 5A with respect to a plane of symmetry 78 through generator axis 51. The latitude or axial position on the ogive at which the cut is made must also be accurately controlled, as well as the angle Q between the tool path 71 and axis 51. Fortunately, optical techniques of known type are available for controlling those parameters, due to the high optical polish of the surfaces involved.

The shape of the lenticule boundary, especially its upper and lower edges 74 and 75, may be controlled conveniently by suitable selection of angle Q. With the tool path inclined downward, as illustrated, for example, a strictly rectangular hollow tool 70 can cause those lenticule edges to be bowed upward relative to the lines of latitude 76 and 77, as indicated schematically in FIG. 5. That method of controlling the horizontal lenticule edges is often useful, especially when selection of angle Q enables a straight or arcuate tool edge to yield a lenticule edge with a desired, relatively complex shape.

A preferred method for forming a tubular tool with accurate internal dimensions for cutting sections 70 from the ogive shells employs replication by electroforming. Conventional machining and polishing techniques are first used to form a bar, preferably of stainless steel, having an external cross section precisely corresponding to the desired internal form of the tool. After suitable treatment of the bar surface, copper is deposited electrolytically to a sufficient thickness to be self-supporting. The copper sleeve is then slipped off the bar, typically with vigorous differential thermal treatment of the bar and shell. For example. The bar is cooled by flowing a mixture of acetone and dry ice through a cavity, followed by flash heating of the highly conductive copper shell. If desired, the bar may have a slight taper to aid release of the shell.

Depending upon the relative dimensions, from four to about seven lenticule blanks 70 may ordinarily be cut from a single ogive replica shell, all from a common zone but at spaced angular intervals. Due to the inherent rotary symmetry of the original ogive, these lenticules are found to be identical with a high degree of precision.

After the described nickel replica 60 has been slipped off the ogive surface, a second replica 60a is typically made in the same manner already described, and a further four to seven lenticules are cut from that second replica. Since a large number of replicas can be made from the original ogive, a very large number of lenticules may be produced, all derived similarly from the same parent configuration and all substantially identical in optical form.

If optimum results are to be attained, each of the isolated lenticule sections is carefully dressed down by hand under high magnification and is inspected for polish, opical configuration and accuracy of edge dimensions and form. Accurate formation of the edges and corners is important if scattered light from the finished screen is to be minimized.

The concave lenticules are then placed face down on a flat surface, preferably an optically polished glass reference plate 90, within a frame 92 for positional reference, as shown somewhat schematically in FIGS. 6 and 7. The elements are arranged in like orientation and in closely packed two-dimensional formation, each one stably supported on its four corners on the reference surface. The rotational symmetry of each lenticule insures that the four corners lie in a common plane.

After a predetermined area of the framed reference surface has been covered by lenticules, the assembly is temporarily secured by light pressure against the back of each element. That pressure is typically produced by soft foamed plastic with a rigid backing, or by applying light suction via a flexible hose to a vacuum bag placed across the back of the frame. The entire assembly can then be handled conveniently without displacing the individual lenticules.

At that stage, the assembled lenticules are preferably examined critically through the transparent and optically plane reference plate 90. The optical form and orientation of the individual lenticules are tested by means of optical procedures familiar in the manufacture of lenses and mirrors. Also, the mutual fit of adjoining lenticules can be examined under high magnification. Any deficiencies are eliminated by opening the backing and rearranging or replacing lenticules. Although this testing and correcting may be laborious, it has been found worth while to impose high standards at this stage, especially since the invention in preferred form requires such detailed fitting of individual lenticules only once.

In some respects the described initial assembly of individual lenticules may be made of any desired size. However, it has been found to be generally preferable to keep that size relatively small, for example from about five to about twenty-five lenticules on a side of the rectangular formation of FIG. 6. With less than about 25 units in the assembly relatively little has been gained in ease of handling and in progress toward reaching an effective panel size for covering the entire screen. With more than about 250 units in the initial assembly the detailed hand work on each unit and the number of edges that must be fitted tend to become excessive. An initial assembly about ten by fifteen units on a side has been found especially advantageous, and will be assumed for illustration.

After all lenticules of the initial assembly of FIGS. 6 and 7 fit properly and display correct and uniform optical behavior, they are permanently bonded together on reference surface 90, as by applying a coating of epoxy adhesive 94 or the like across the backs of the lenticules. A flat and effectively rigid backing plate 96 is then cemented to the bonded units, typically with silicone adhesive indicated at 98, producing a rigid assembly 100 (FIG. 8), which can be lifted from reference plate 90 and manipulated freely as a unit. When lenticule blanks 70 are of nickel, stiffening plate 96 is preferably of stainless steel, which matches nickel closely in thermal expansion.

The front face of the bonded and rigidized lenticule assembly 100 is replicated, preferably by electroforming in the manner already described. The bonded concave lenticule blanks of assembly 100 are thereby converted to a strictly unitary formation 104 of convex lenticules. To facilitate handling, the back face of that unitary array is mounted on a rigidizing plate 106, as by epoxy indicated at 108, producing the convex unitary replica master 110 of FIG. 9.

Before replicating original assembly 100, it is desirable to go over its polished face and fill any fissures that remain between elements 70, and especially at their corners. During electroforming, metal tends to be deposited even in microscopic crevices of that sort, forming ridges or fingers which project from the face of the replica. Such fingers make parting difficult and reduce the number of successive replications that can be made. Any projecting fingers that may still be produced are removed from replica 104 by hand grinding and polishing. The unitary structure of FIG. 9 then has a smooth convex polished face capable of giving a statisfactorily large number of concave replicas. That unit typically has an area corresponding to the initial assembly of FIG. 6.

The convex face of that unit 104 is repeatedly replicated, producing a relatively large number of units 114, FIG. 10, with concave polished faces, still of an area typically corresponding to the original assembly of FIG. 6. Those replicas are assembled in closely packed arrangement, typically on a transparent reference plate similar to plate 90 but of appropriately larger size. Those assembled units are preferably checked visually for accuracy, and are then bonded together and rigidized, typically as already described for the original assembly of individual lenticule blanks. The resulting structure is similar in section to FIG. 8, except for its larger area and the fact that mechanical divisions between lenticules occur only at the junctions between the original units of FIG. 9.

The number of units 114 in that assembly may be selected within wide limits. The two-dimensional assembly may include five units on a side, for example, typically leading to a panel of the order of 18 by 80 inches, which is generally a convenient size of panel for mounting on the screen support structure. After being bonded and rigidized, the assembly of concave elements is converted to unitary form, typically by a series of steps corresponding to some or all of the above illustrative described steps from FIG. 7 to FIG. 10. The resulting concave unitary structure of panel size may then be replicated through any desired series of steps to produce the required number of panels, typically of the order of 1500, each of which is suitably rigidized and provided with fixtures for mounting on the screen. Such a lenticular panel is shown in FIG. 11.

A further aspect of the invention provides improved distribution of reflected light within the viewing area. Discussions of light distribution in the prior art have all assumed, so far as applicant is aware, that the apparent image brightness should be as uniform as possible throughout the viewing area. That is the clear implication, for example, of Clark's comments at page 9 of his above identified —262 patent.

In contrast to that view, applicant has discovered that, under conditions common to many drive-in theaters, sharply non-uniform light distribution can greatly improve the picture brightness for up to 80% of the audience, with significant reduction of brightness for only a small fraction of the remainder. That overall improvement does not affect other advantages of the present system, such as exclusion of sky light and containment of the projected picture within specified boundaries.

That net gain in overall visibility is attained by utilizing the relative freedom of design of the vertical curvature of the lenticules that is made available by the present mode of manufacture. It has been found possible, by suitable modification of generator line 54 of FIG. 4, to direct an increased fraction of the available light to those portions of the viewing area where the density of viewers is greatest. In that connection the viewer density refers to the number of viewers per unit of vertical angle subtended at the center, say, of the screen.

The significance of introducing that concept of viewer density as a control parameter is well illustrated in FIG. 2. That figure shows an illustrative 20-degree vertical spread of light beam 33, reflected from a single typical lenticule at screen center 24. That beam is divided arbitrarily into four equal 5-degree sectors which intersect definite respective portions of the viewing area, seen as ground plane 20. Though each of those areas subtends the same vertical angle at the screen, the beam geometry causes them to have radically different dimensions parallel to optical axis 21, extending from A to B, from B to C, and so on. For example, in the particular case shown for illustration, the axial dimension of area AB is approximately three times that of area BC, and exceeds the sum of areas BC, CD and DE. It is evident that those four areas accommodate very different numbers of viewers.

Additional inequality of viewers density may result from variation of the lateral dimension of the viewing area. In the present generally "pie-shaped" viewing area, for example, the lateral width of the viewing area is most conveniently measured along the arcuate ramps 26. As can be seen from FIG. 1, the number of viewers in each ramp varies approximately in proportion to the radial distance of the ramp from center 28. Thus the density of viewers, considered as a function of vertical angle within beam 33, is strongly biased toward the upper boundary 31 of that beam, due both to the smaller angle of incidence at which that portion of the beam intersects the ground, and to the increased lateral dimension of the viewing area farther from the screen.

In presence of such strongly varying viewer density per unit of vertical beam angle, whatever the specific cause, the present invention preferably favors the area of greater viewer density, assigning an abnormally large fraction of the entire lenticule surface to serving the favored beam sector. That is accomplished by forming the lenticule with an abnormally small vertical curvature within the angular range to be favored. That reduced curvature automatically increases the linear dimension of the lenticule portion that corresponds to each angular increment of the beam. An increased proportion of the available light is thereby concentrated into the favored beam sector. The lenticule curvature is then progressively increased, typically throughout the remainder of the lenticule surface, at a rate sufficient to spread the reflected beam over the entire viewing area.

As schematically represented in FIG. 12, the lenticule 24a at the screen center 24 receives effectively parallel light 21a along projector optical axis 21. The orientation of the lenticule surface in the vertical plane of the drawing is such that light incident near its lower edge at A' is reflected along the line A'A. That direction corresponds to the ray A of FIG. 2 at the upper boundary of reflected beam 33, and typically illuminates rear ramp 26a of that figure and of FIG. 1. The average curvature of the lenticule surface between A' and the point B' is such that the reflected ray from B' is directed toward B, forming an angle of 5° with the ray A'A. That 5-degree beam of FIG. 12 thus corresponds to the beam segment between 0° and 5° in FIG. 2, and illuminates the portion of the viewing area between A and B of FIGS. 1 and 2. Similarly, the beam BC lights viewing area BC, and so on, with lenticule edge portion E' lighting front ramp 26b at E. The illustrated crossing of the reflected rays in front of the lenticule in FIG. 12, so that the upper portion of the lenticule illuminates the front ramps of the theater and the lower lenticule portion illuminates the rear ramps, results, of course, from the selection of a lenticule with concave vertical curvature. For lenticules with convex vertical curvature the pattern of reflections at the lenticule would be inverted, with A' at the top and E' at the bottom edge.

In accordance with the invention, the vertical curvature of the lenticule surface is made to vary over the height of the lenticule in generally inverse relation to the density distribution of the audience in the corresponding portions of the viewing area. Thus, the lenticule surface between a' and B', which serves the portion AB of the viewing area where the density of viewers per unit of vertical beam angle is the greatest, is made relatively small. Due to that small curvature, the 5-degree beam portion AB occupies a correspondingly large fraction of the lenticule height, shown typically as about one half the total height from A' to E'. Beyond lenticule portion A'B' the surface curvature increases progressively from B' to E', causing the three 5-degree beam portions BC, CD and DE to occupy progressively smaller linear portions B'C', C'D' and D'E', respectively, of the lenticule surface. As the surface curvature increases toward E' each unit of angular dimension of the reflected beam receives light from a smaller linear dimension of the lenticule surface, progressively reducing the apparent brightness of the screen for viewers in that part of the beam. However, all of the light thus removed from the relatively few viewers in the front ramps is transferred as improved visibility to the favored area with its higher density of viewers.

The detailed curvature distribution over the height of the lenticule, and the resultant brightness distribution over the reflected light beam, can be selected with considerable flexiblility to meet particular requirements and preferences of each theater installation. That selection is subject, of course, to the basic condition that the overall change of lenticule surface angle must correspond to the required vertical angular dimension of the reflected beam. That angular beam dimension, shown typically as 20°, is ordinarily dictated by the basic geometry of the theater.

In addition to that effectively rigid restraint, the lenticule curvature must vary smoothly in a manner to avoid abrupt changes of brightness on the screen such as would be apparent to viewers. To insure uniformity of screen appearance for the many viewers who are favored with enhanced screen brightness, the lenticule curvature is preferably made entirely or substantially constant throughout at least most of the lenticule portion that serves that part of the viewing area. The curvature is then allowed to increase, almost imperceptibly at first, and then at a gradually increasing rate. The rate of curvature increases may become quite large as the lenticule edge at E' is approached. The slow initial increase serves both to avoid any visibly abrupt change in screen appearance and to extend as far as practicable the viewing area in which the screen brightness, though less than the selected maximum, still exceeds the average value it would have if the vertical curvature were constant over the entire lenticule.

A lenticule having the optical form represented in FIG. 12 is typically produced by suitable control of the machining process by which the master ogive of FIG. 4 is produced. Such may be exercised, for example, by supplying to a precision grinding and polishing machine suitable definition of the desired form of generator curve 54. Such a definition may comprise a series of points along the curve, expressed as respective x and y coordinates. Those points may be arbitrarily selected in any suitable manner, but are preferably derived geometrically in a manner that insures the desired smoothness of the resulting curve.

For example, as schematically represented in FIG. 13, generator curve 54a may comprise a series of arcuate segments having progressively decreasing radii of curvature. The first segments A'B' is shown illustratively as a circular arc about the point A" with the radius of curvature R1. That arc may extend through half or more of the working height of the ogive between planes 76 and 77, and typically subtends at A" an angle of the order of 2.5°. Beyond B' the desired gradually increasing curvature of curve 54a may then be constructed as a series of short arcs with the center of each selected on the final radius of the preceding segment. Thus arc B'C' is drawn with the radius R2 about the center B" which lies on the radius A"B'. With that method of construction the segments A'B' and B'C' automatically have a common tangent at B', insuring smooth junction of the two arcs. At point C' of generator curve 54a the center is again shifted inward, along the radius B"C', to C" and the next segment C'D' is constructed on that center with the radius R3. And segment D'E' is an arc about D" with radius R4. For clarity of illustration the angles in FIG. 13 are exaggerated, and only four segments are explicitly shown, which may or may not corresponds directly with the similarly designated segments of lenticule 24a of FIG. 12. In actual practice, the segements other than A'B' are preferably much shorter than shown, typically only about 10 mils long, for example; and any desired number of points may be computed along each segment for supply to the grinding machine.

In summary of this aspect of the invention, light is typically directed from about half or more of each lenticule into roughly one quarter of the total reflected beam. That has the striking result, under favorable conditions of theater geometry, of doubling the screen brightness for some 80% of all the viewers. Even where special geometry makes the gain more modest, or limits it to a smaller proportion of the audience, a major improvement is still ordinarily obtainable. It is emphasized that this gain is superimposed upon the full brightness gain that has normally been considered theoretically possible if optically accurate specularly reflective lenticules could ever be made available.

Moreover, the corresponding reduction of screen brightness that this aspect of the invention imposes upon other viewers is found to be less serious that would be expected. That is both because relatively few viewers are actually disadvantaged, and because even those most seriously affected still have a generally satisfactory picture. Since the variation in lenticule curvature is made gradual and smooth, the average brightness for many of the less favored viewers is still no less, or only slightly less, than it would have been under uniform light distribution. The most disadvantaged viewers are those in the first two or three ramps of the theater, which are seldom fully occupied. Even from that position there is good illumination in the lower part of the screen, though with gradual fading of brightness toward the top. It has been established that human vision of an illuminated surface will accept as reasonably uniform a brightness variation as great as 3:1 provided the transition is gradual and continuous. Thus even the small fraction most seriously imposed upon are still as well off as they would be with a conventional screen.

Another aspect of the present invention provides improved fit of the light beam from the screen in certain types of viewing area. As already indicated, a viewing area of general fan shape, as shown typically in FIG. 1 with radial side edges meeting in the neighborhood of the screen and with concentric circular ramps, can be fitted remarkably closely in lenticules that are substantially square or rectangular. Some theaters comprise areas that are fairly regular quadrilateral, typical square, rectangular or diamond-shaped, with the screen at one corner. Such a form is shown typically in FIG. 15. The additional area 120, as compared to FIG. 1, can be filled effectively by outwardly bowing the horizontal lenticule edge that corresponds to the rear boundary of the theater. The bowed edge typically forms a somewhat rounded obtuse angle, as indicated at the lower edge 122 in FIG. 13. The upper lenticule edge, which controls the light beam boundary at the front of the theater, is preferably altered in complementary manner. Adjacent lenticules of each panel will then fil accurately when they are assembled as described in connection with FIG. 6.

On the other hand, when the unitary lenticule assemblies of FIG. 10 are assembled in turn to form larger units, it has been found difficult to obtain perfect fit of the scalloped upper and lower assembly edges. That difficulty is overcome by trimming those edges along straight lines at complementary points of the top and bottom rows of lenticules. That provides clean mating edges on the adjacent assembles with the sacrifice of only one row of lenticules. The trimming lines are preferably positioned as shown at 126 and 128 in FIG. 14 just below the bow of the edge that controls light at the front of the theater. Any imperfection of fit between assemblies then affects primarily the relatively few viewers in the front ramps of the theater.

A generally rectangular viewing area 130 with screen 30 in one corner, as in FIG. 16, can be effectively illuminated according to another aspect of the invention by designing lenticules substantially as if the area were square with a side of length intermediate that x and y dimensions of the rectangle, as indicated in dashed lines at 132. Such lenticules are typically of a form generally similar to that shown in FIG. 14. The lenticules are then mounted on the screen so that the plane of symmetry between that parallel lenticule edges 129, which would normally be vertical and perpendicular to viewing area 139, is instead inclined in the general plane of the screen in the direction toward the corner of the rectangle that is nearer the screen, shown typically at 134 in FIG. 16. The angle of that lenticule inclination in azimuth with respect to the optical axis is selected with respect to the difference between the two sides of the rectangle. The exact relation for best results usually depends also on other geometrical factors of the layout, and can be calculated from basic optical principles or determined by test, typically using a mock-up at reduced scale. For a rectangle of the proportions shown illustrated in FIG. 16 an inclination of only a few degress will typically compensate effectively for the departure from symmetry.

I claim:
1. Projection screen for a motion picture theater and the like having an optical projector and having a generally flat viewing area with two side boundaries which diverge generally radially from a point near the screen and with an unsymmetrical rear boundary which intersects the side boundaries at respective area corners one of which in nearer to the screen than the other, said screen carrying a two-dimensional array of lenticules each having a specularly reflective surface which has the optical form of a surface of revolution with respect to a generator axis that is generally perpendicular to the viewing area to distribute reflected light from the projector over said viewing area; the improvement characterized in that each lenticule is substantially symmetrical with respect to a plane of symmetry through the generator axis, and each lenticule is mounted on the screen with said plane of symmetry perpendicular to the lenticule array and inclined from perpendicular to the viewing area in the direction toward the area corner nearer to the screen, the angle of said inclination being selected with respect to the relative distances of said area corners from the screen to compensate said unsymmetry of the rear boundary of the viewing area.

2. Lenticular panel adapted for use in a motion picture projection screen and the like and having a panel face comprising a two-dimensional array of closely nested, optically smooth, specularly reflecting lenticule surfaces; further characterized in that each said lenticule surfacd is surface of revolution with respect to a generator axis, all said lenticule surfaces are optically identical by virtue of being produced by replication of equivalent areas of a bounding surface of a single solid body, which bounding surface is a surface of revolution having rotational symmetry with respect to the general axis, each said lenticule surface has a boundary which includes four coplanar corners, and the generator axes of all the lenticules of the panel are to each other and are inclined with respect to said panel face at a common oblique angle such that the lenticule corners of all lenticules of the panel lie in a common plane.

3. Lenticular panel for a projection screen for a drive-in-theater or the like having a generally horizontal viewing area which subtends at the screen center a predetermined vertical angle, the individual lenticule surfaces being curved vertically through a corresponding total bend angle to distribute reflected light throughout said angle subtended by the viewing area, the audience having a non-uniform density distribution with respect to said subtended angle; further characterized in that said vertical curvature of the lenticule surfaces varies over the vertical dimension of each lenticule in generally inverse relation to the corresponding density distribution of the audience, whereby the apparent brightness of the projected image is enhanced for the relatively many viewers in areas of more dense distribution, and is reduced only for the relatively few viewers in areas of less dense distribution.

4. Lenticular panel according to claim 3 wherein said audience density has a maximum value near the rear boundary of said viewing area and decreases progressively toward the front boundary of that area, said vertical curvature is approximately constant throughout a first lenticule portion which adjoins the lenticule edge corresponding to said rear boundary, and increases progressively throughout a second lenticule portion which extends from said first portion to the lenticule edge corresponding to said front boundary.

5. Lenticular panel according to claim 4 wherein the rate of said curvature increase becomes progressively larger at least adjacent the lenticule edge corresponding to said front boundary.

6. Lenticular panel according to claim 4 wherein said first lenticule portion occupies between about half and about three quarters of the lenticule vertical dimension.

7. Lenticular panel according to claim 4 or 6 wherein the rate of said curvature increase is such that the integrated curvature over said second lenticule portion exceeds the integrated curvature over said first portion by at least about 50 per cent.

* * * * *